US005668876A

United States Patent [19]

Falk et al.

[11] Patent Number: 5,668,876
[45] Date of Patent: Sep. 16, 1997

[54] USER AUTHENTICATION METHOD AND APPARATUS

[75] Inventors: Johan Per Falk, Stockholm; Björn Erik Rutget Jonsson, Järfälla, both of Sweden

[73] Assignee: Telefonaktiebolaget LM Ericsson, Stockholm, Sweden

[21] Appl. No.: 264,939

[22] Filed: Jun. 24, 1994

[51] Int. Cl.⁶ .............................. H04L 9/32; H04L 9/00
[52] U.S. Cl. ...................... 380/25; 380/4; 380/23; 380/49; 340/825.31; 340/825.34; 235/380
[58] Field of Search .................... 380/4, 23, 24, 380/25, 28, 30, 49; 235/379, 380; 340/825.31, 825.34

[56] References Cited

U.S. PATENT DOCUMENTS

| | | | |
|---|---|---|---|
| 4,223,830 | 9/1980 | Walton | 235/380 |
| 4,236,068 | 11/1980 | Walton | 235/380 |
| 4,268,715 | 5/1981 | Atalla | 379/62 |
| 4,384,288 | 5/1983 | Walton | 340/825.34 |
| 4,436,957 | 3/1984 | Mazza et al. | 379/62 |
| 4,606,073 | 8/1986 | Moore | 455/89 |
| 4,654,481 | 3/1987 | Corris et al. | 379/62 |
| 4,935,962 | 6/1990 | Austin | 380/25 |
| 4,992,783 | 2/1991 | Zdunek et al. | 340/825.34 |
| 4,995,083 | 2/1991 | Baker et al. | 380/23 |
| 5,077,790 | 12/1991 | D'Amico et al. | 380/528 |
| 5,131,038 | 7/1992 | Puhl et al. | 380/23 |
| 5,153,581 | 10/1992 | Hazard | 340/825.34 |
| 5,168,520 | 12/1992 | Weiss | 380/23 |
| 5,282,250 | 1/1994 | Dent et al. | |
| 5,287,545 | 2/1994 | Kallin | 455/33.1 |
| 5,390,245 | 2/1995 | Dent et al. | |

FOREIGN PATENT DOCUMENTS

| | | | |
|---|---|---|---|
| 0 374 012 | 6/1990 | European Pat. Off. | G07F 7/10 |
| 0 505 637A2 | 9/1992 | European Pat. Off. | H04Q 7/04 |
| 0 650 307A2 | 4/1995 | European Pat. Off. | H04Q 7/38 |
| 3 405 381 | 8/1985 | Germany | H04Q 7/02 |
| 3 420 460 | 12/1985 | Germany | H04Q 7/02 |
| 2 190 820 | 11/1987 | United Kingdom | H04L 9/02 |
| WO92/20048 | 11/1992 | WIPO | G07F 7/08 |
| WO93/17529 | 9/1993 | WIPO | H04Q 7/04 |

OTHER PUBLICATIONS

H. Beker and F. Piper, Cipher Systems—The Protection of Communications, pp. 305–311, 320–322, published in Great Britain (1982).

"EIA Project Number 2215," Electronic Industries Association Engineering Department, published in Dec. 1989, pp. 2–72 to 2–73.

Sören Wallinder, "Implementation of UPT—Universal Personal Telecommunication," *Ericsson Review*, No. 1, 1994, pp. cover, 40–48.

EIA/TIA Interim Standard, "Cellular System Dual-Mode Mobile Station—Base Station Compatibility Standard," IS-54-B, Apr. 1991, pp. cover 86–99.

"European digital cellular telecommunications system (Phase 2); Security aspects (GSM 02.09)," *European Telecommunications Standards Institute*, Oct. 1993, pp. 1–12.

"European digital cellular telecommunications system (Phase 2); Security related network functions (GSM 03.20)," *European Telecimmunications Standards Institute*, Oct. 1993, pp. 1–53.

*Primary Examiner*—Bernarr E. Gregory
*Attorney, Agent, or Firm*—Burns, Doane, Swecker & Mathis, L.L.P.

[57] ABSTRACT

Authorization for a user to use a service is provided by a modified pager which calculates a unique response code to a transmitted challenge code based on the challenge code, an input personal identification number, and an internal key. The response code is input to a simple terminal, such as a telephone and if the unique response code is acceptable, the user may access the desired service, such as cashless transactions or long distance phone service.

37 Claims, 3 Drawing Sheets

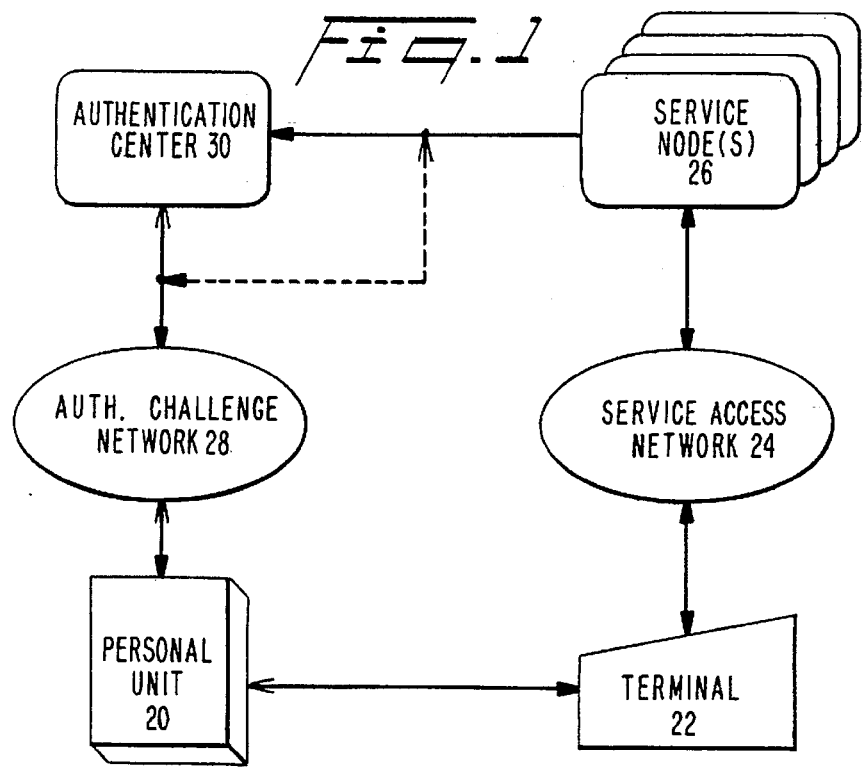
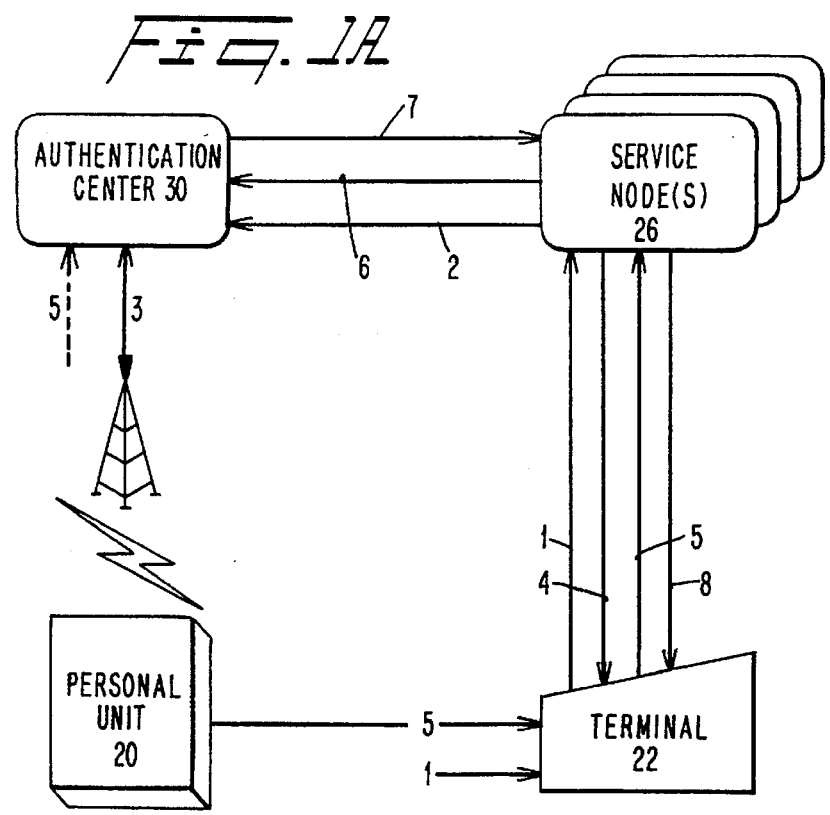

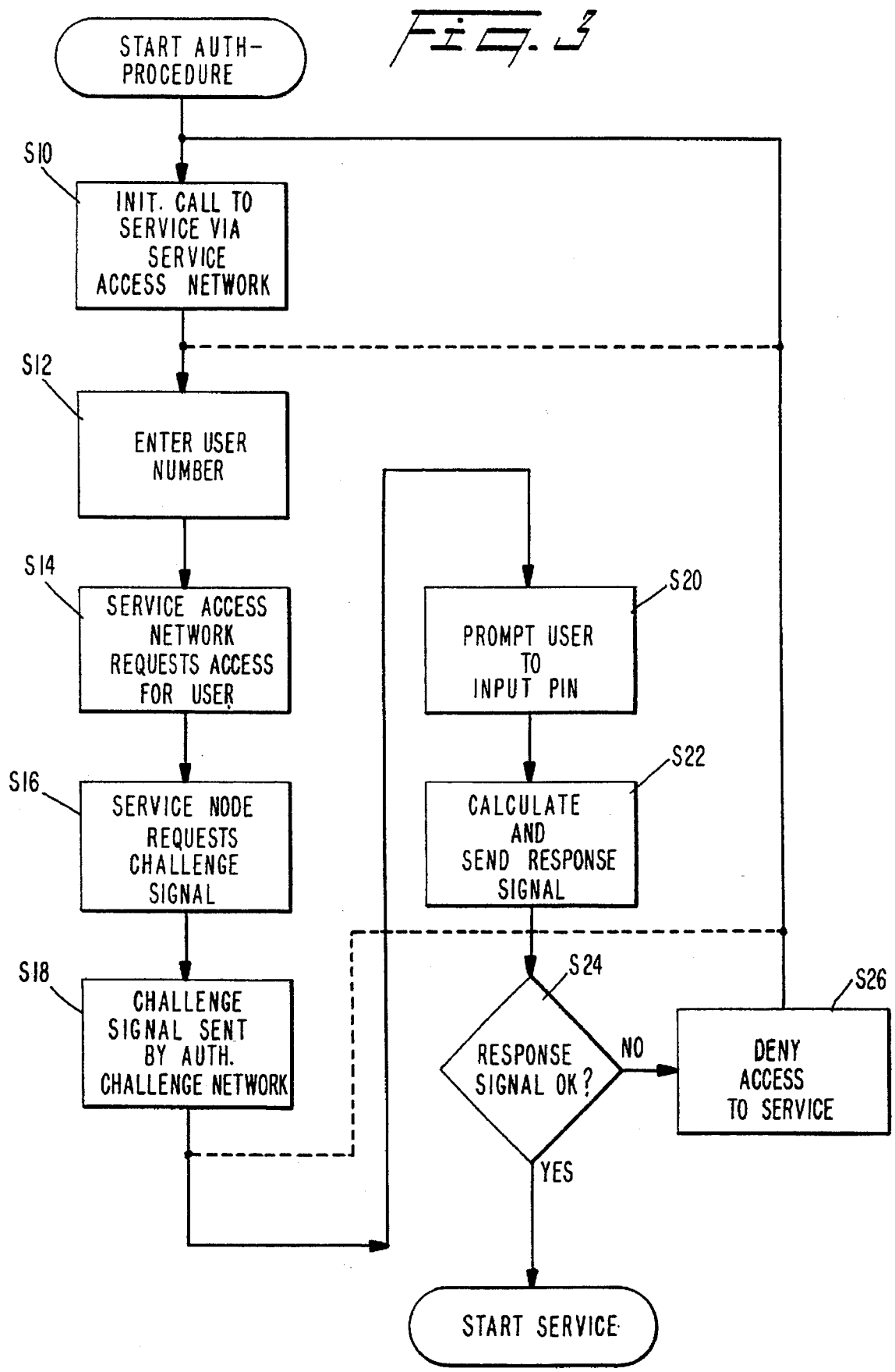

USER AUTHENTICATION METHOD AND APPARATUS

BACKGROUND OF THE INVENTION

1. Field of the Invention

The present invention involves a method and an apparatus for authentication of a user attempting to access an electronic service, and, in particular, providing an authentication unit which is separate from preexisting systems.

2. Description of Related Art

Effective authentication methods and apparatuses have been in great demand to prevent fraud and theft of services. This demand increases with the explosion of electronic services in the current information age. Electronic services such as banking services, credit card services, automatic teller machine (ATM) services, account information services such as mortgage, savings and investment accounts, general information services such as data base services and networks, security services and long distance phone services all require that a user be accurately identified for purposes of security, proper billing and avoidance of fraud. Recently, fraud in the cellular mobile telephone industry has placed so great a demand on effective authentication methods that a protocol has been standardized for cellular mobile systems. See, GSM 03.20, European Telecommunications Standards Institute (ETSI), 1993, pp. 19–29 and U.S. Pat. No. 5,282,250, herein incorporated by reference.

However, conventional authentication systems have required specially equipped terminals with card readers such as ATMs or credit card gas station terminals, data terminals using a log-in procedure, or cellular mobile radio stations with built-in authentication capabilities. Credit cards having a magnetic snip provide only minimal security insomuch as the bearer of the card is usually permitted to conduct transactions without further authentication of the user's identification other than perhaps comparing a unauthenticated signature on the card to a signature of the user. Even in transactions when signatures are required, the certainty of the user's identification is minimal.

Other identity cards, such as ATM cards, require a log-on procedure with a password, or PIN. But the PIN, once learned by an unauthorized user, offers no security in authenticating the user if the user can duplicate the ATM card.

These methods of authentication require specially equipped, and often dedicated, terminals, which raises the cost and reduces the availability of the associated electronic service. In other words, the prior art security systems often require a dedicated or customized terminal or modification to existing terminals, which greatly restricts the use of security systems to specific sites. Also, a user may use several electronic services, each service requiring an authentication procedure and/or personal identification number (PIN) or password, each procedure or password different from the others. As a subscriber to several electronic services, a user might end up with numerous passwords to remember. Even worse, he or she may be required to change these passwords periodically, thus having to remember if a password is still valid or not.

Also, transactions requiring relatively certain authentication have been largely unavailable from relatively simple terminals like telephones. For instance, home banking by telephone has been limited to transactions involving the bank customer's own accounts or using only the customer's own telephone.

SUMMARY OF THE INVENTION

The present invention overcomes these and other problems by providing an authentication procedure wherein the user carries a personal unit not limited to use with or physically connected to a terminal of any one specific electronic service. The personal unit can be used to authenticate a user's identity through a variety of terminals associated with a variety of electronic services.

The personal unit includes a receiver for receiving a transmitted challenge code and an algorithm unit which processes the challenge code, a user input such as a personal identification number (PIN) or electronically recognizable signature, and an internally stored security key for calculating a response code according to a pre-stored algorithm. The response code is then sent to the service node and, if it is acceptable, access to the service is authorized.

The basic method involves receiving a challenge code from a system, the user inputting a personal identification number or other recognizable input, and the personal unit generating a response code based on an internally stored algorithm. The PIN or other user input may be changed from time to time, and the challenge code and the response is unique for each transaction. The personal unit may receive and store a plurality of challenge codes for later use.

The personal unit can be used with virtually any existing terminal of an electronic service without requiring the terminal to be modified or customized. For instance, the personal unit can be used with a standard telephone, whether a radio telephone or land-line telephone. The user can input the response code displayed on the personal unit through the telephone keypad or the personal unit can include a DTMF transmitter for direct input of the response code into the microphone of the telephone. It follows that the keypad of any service terminal (e.g., a dam terminal connected to a service computer) can be used to input the response code. If some other input device is used in a terminal, such as an acoustic input, a inductively coupled input, an optical input, radio receiver (particularly if the terminal is by-passed and the response code is transmitted directly to the authentication center), etc., the personal unit can include a compatible output device. In other words, the personal unit can be modified or equipped to be compatible with existing or perspective terminals, rather than having to modify the terminals to suit the authentication procedure.

The same basic authentication procedure can be used for all services the user might wish to engage, the procedure being modifiable to suit any specific requirements of the electronic service. The user may have one personal unit for all the services he may wish to subscribe to, or several personal units, each unit being usable with one or a subset of services to which the user has subscribed.

BRIEF DESCRIPTION OF THE DRAWINGS

The present invention will now be described with reference to the attached drawing figures in which:

FIG. 1 is a schematic diagram of an authentication pager system in accordance with the present invention;

FIG. 1A is a schematic diagram of an authentication pager system with reference to specific communications in accordance with the present invention;

FIG. 3 is a flowchart outlining the authentication process in accordance with the present invention.

DETAILED DESCRIPTION OF THE PREFERRED EMBODIMENTS

Hardware of the System

Figure 2:
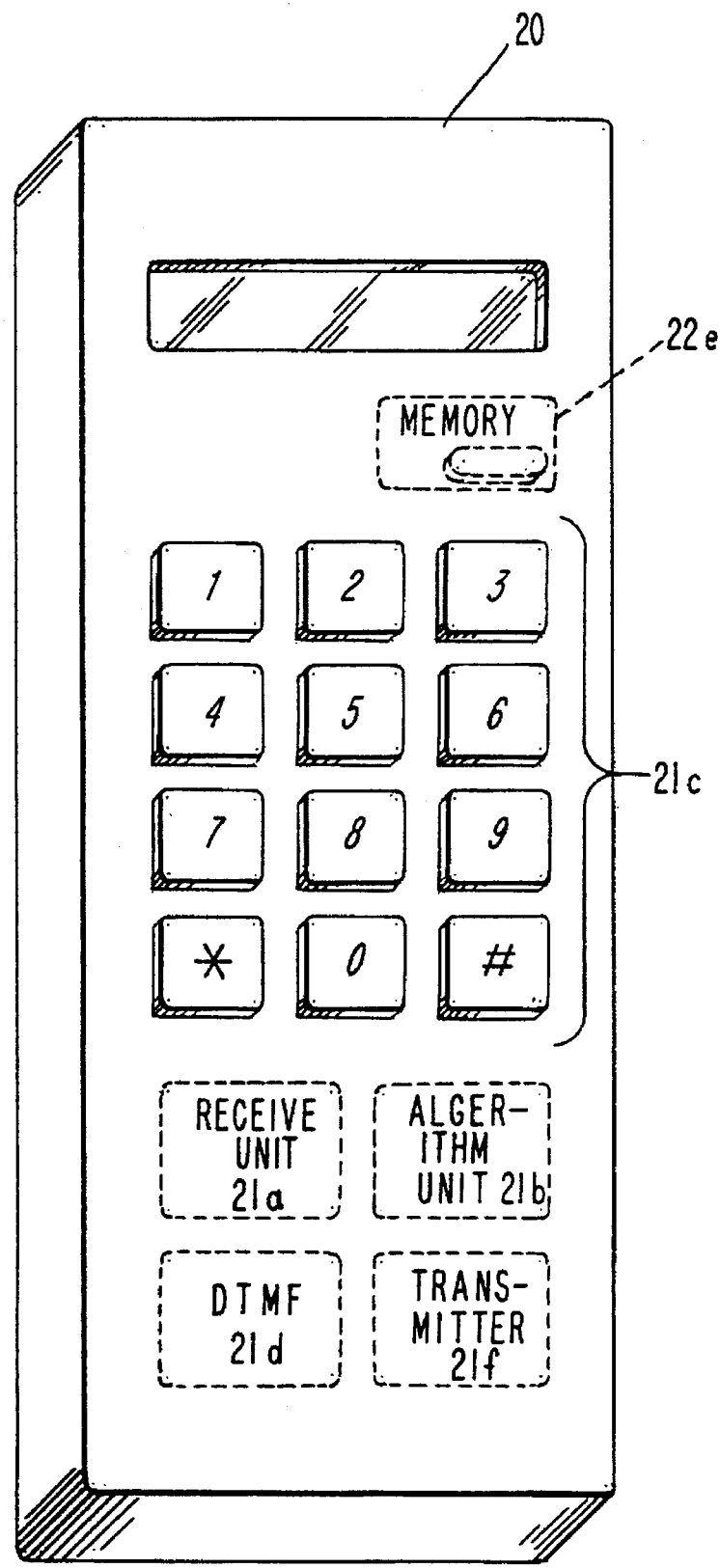
FIG. 2 is a perspective view of a personal unit in accordance with the present invention.

Referring to FIG. 1, the present invention includes a personal unit 20 for generating a response code, a terminal 22 for initiating service access and conducting service, and for inputting the response code to a service access network 24. The service access network transmits data between the terminal 22 and a service node 26. The service node 26 generates a challenge code and requests that the challenge code be sent to the personal unit 20 via an authentication challenge network 28. Alternatively, the separate authentication center 30 can generate the challenge code upon request by the service node 26. The terminal 22 can be a land-line telephone, a radio telephone, an ATM, a computer with a modem (modulator/demodulator), a facsimile machine, or virtually any other type of terminal capable of receiving an input directly or indirectly from the personal unit 20 and relaying information to a service node 26.

The service node 26 may be any form of electronic service, such as banking or financial services, credit card services, long distance telephone services, information services, etc. The type of service provided is not germane to the present invention. One of the advantages of the personal unit 20 of the present invention is that it can be used for authenticating the user of any service.

In an exemplary embodiment, the authentication center 30, whether separate or as part of the service node 26, includes a radio transmitter, storage for one or more algorithms, and a comparator to compare the received response code to an expected response code. The authentication center 30 can be realized in the form of additional software added to a preexisting pager system or other radio communication system. The separate authentication center 30 enables many service nodes or networks to use one authentication center 30. This permits changes in the authentication procedure to be done at one location for all applications and permits one authentication procedure to be used for more than one service, and perhaps all services to which a user has subscribed.

The service access network 24 can be in the form of any communication system, such as a public or private telephone network, telegraph, or other land-line system, cellular radio telephone network, or other radio communication network. The form of the service access network 24 can be in any form capable of transmitting information from the terminal 22 to the service node 26. The service access network 24 in some of the examples provided below is in the form of a preexisting telephone network.

The authentication challenge network 28 can be the same network as the service access network 24, or preferably a distinct and separate network. The authentication challenge network 28 can be any communication system, such as a public or private telephone network, telegraph, or other land-line system, cellular radio telephone network, or other radio communication network. The authentication challenge network 28 can be in any form capable of transmitting information from the service node 26 (or authentication center 30) to the personal unit 20. In one embodiment, the authentication challenge network 28 is a preexisting wide area pager system capable of broadcasting a personal unit identification number and additional information, such as at least one challenge code. Existing pager systems which can transmit at least the telephone number the user is being prompted to call have sufficient capabilities to function with the personal unit 20 disclosed herein. Any form of radio communication system can provide the optimum security offered by the present invention because only a specific receiver properly generate the expected response when the proper PIN or the like is input. However, the user can be required to manually input in the personal unit 20 a challenge code provided over an interactive service access network 24.

In the exemplary embodiment of FIG. 2, the personal unit 20 includes a receiver unit 21a for receiving the challenge code, and an algorithm unit 21b, operatively connected to the receiver unit 21a and preferably including an input device for receiving a user input, such as a security number, e.g., a PIN. The receiver unit 21a can be in the form of the radio receiver of a pager having a digital display capable of displaying a caller's telephone number or the like. The personal unit 20 can be essentially a conventional pager which is modified to include, for example, an algorithm unit 21b, an input keypad 21c and optionally a dual tone multi-frequency (DTMF) generator 21d (if automated input of the displayed response code is preferred where the terminal 22 is connected to some form of audio communications network). The personal unit 20 may include a transmitter 21f in an embodiment where the service access network 24 includes a radio uplink, or where the response code is directly sent to the authentication center 30 or service node 26. The algorithm unit 21b calculates a response code in accordance with the received challenge code, an appropriate input security number and optionally a secret key (a secret number or code provided by the supplier of the personal unit 20) entered into storage in the personal unit 20 at the time of subscription. Algorithms of this type are known in the art or readily derived therefrom. See, GSM 03.20, Appendix C.2, algorithm A3, for example. The specific algorithm used in a given embodiment is not germane to the present invention. A memory 21e is provided to store the algorithms, the secret key, received challenge codes and computer programming as a specific embodiment makes expedient. The personal unit 20 may be microprocessor driven.

This provides a triple check on the identity of the user, requiring information from three separate sources (user: PIN, service node or authentication center: challenge code, and provider of the personal unit: secret key), thereby increasing the relative security of the transaction against fraud or other unauthorized use.

In a preferred embodiment, the personal unit 20 is a separate unit, thereby minimizing or avoiding the need to customize a communication device such as a cellular telephone. The receiver unit 21a, input device 21c, and the capacity for performing the necessary calculations exists in conventional cellular telephones and personal communication units, allowing the present invention to be implemented through software.

The challenge code can either be unique to a given transaction or broadcast, for example, to all such personal units in use at a given time. The response code is to be unique to each transaction in either scenario. Also, in either scenario, the challenge codes should be changed on a periodic or a random basis to provide additional security for transactions. Similarly, the user input, such as a PIN, can be updated at the user's discretion or on a regular basis. Even the algorithm can be changed from time to time, or more than one algorithm can be stored in the personal unit 20, which can be either cyclically used in a predetermined order or changed after a predetermined number of uses. As long as the authentication center 30 can determine what algorithm, what secret key (if used), and what user input should have been used for a given transaction, the user can be authenticated.

The algorithm unit 21b calculates a response code based on the received challenge code, the user input (e.g., PIN), and optionally the secret key. Thus, for a correct response code to be generated, the challenge code, the user input and the secret key (if used) have to be in accordance with the expectations of the service node 26 or authentication center 30 if access to the service is to be granted. The service node 26 or the authentication center 30 is provided with enough information to be able to anticipate the proper response code. Thus, for a transaction to be authorized, the user must know the appropriate user input (e.g., PIN), be in possession of the correct personal 20 unit and receive the appropriate challenge code.

A conventional twelve button (0-9, * and #) keypad 21c is preferably provided for inputting the user input as shown in FIG. 2. Alternatively, a reduced or expanded keypad can be used with lesser or greater security being afforded thereby. A character recognition device which can recognize a signature or other writing can be used for the user input device. Also, fingerprint or retinal scanner can be used for added security in appropriate situations.

For example, the challenge code may have 10 decimal digits, the secret key may have 12 decimal digits, the PIN may have 4 decimal digits, and the response code may have 8 decimal digits.

Authentication Process

A user initiates a service access through terminal 22 by transmitting the request over a service access network 24 to a service node 26. The service node 26 does not immediately initiate the services offered. Rather, it generates a challenge code or causes a challenge code to be generated in an authentication center 30. The challenge code is sent over an authentication challenge network 28 to the personal unit 20.

When the personal unit 20 receives an authentication challenge code, it prompts the user to input a PIN or other identifying information, and generates a response code by an algorithm having the challenge code, an internal security code and the PIN as variable. Alternatively, several challenge codes can be received and stored in the personal unit 20, and the user prompted for the user input when attempting access to an electronic service. The user inputs a PIN, for example, via the keyboard 21c of the personal unit 20. However, known character recognition devices can be used to recognize a signature, or writing generally, which is input on a pad via a stylist. Other possibilities include a finger print or retina/scan devices, though the expense of these devices makes a practical embodiment less likely except for transactions requiring the highest form of security.

The internally stored algorithm then generates a response code based on the challenge code, the user input, and optionally a secret key.

The response code is either displayed on a display (FIG. 2) for manual input to terminal 22, or electronically, acoustically or optically input to terminal 22 which then transparently transmits the response code over the service access network 24 to the service node 26. Alternatively or additionally, the response can be transmitted over the authentication network 28 to the authentication center 30 which then may send the response to the service node 26, or compare the response to an expected response and forward the result to the service node 26. If the response code is acceptable, the service node 26 permits the user to access the services offered. The response code is compared to an expected response code, which, in exemplary embodiments, may be pre-stored or generated using the same algorithm and variables. Because the communication links in the authentication challenge network 28, and perhaps the service access network 24 may suffer from noise (e.g., radio interference), some tolerance may be given in the result of the comparison. In other words, the response code and the expected response code do not have to be exactly the same to gain access to the service, particularly when using an analog, rather than a digital, transmission format.

With reference to the flow chart of FIG. 3, an exemplary authentication process begins at step S10 where a user initiates communication to a service node 26 via the service access network 24. This can be as simple as picking up the telephone and dialing an appropriate telephone number, which may be pre-stored in the personal unit 20. At step S12, the process may include entering a user number or identity, such as used for a data service. As shown at step S14, the service access network 24 transparently communicates an access request from the user to the service node 26. The service node 26, in response to the access request, requests authentication via an authentication challenge network 28 by sending a authentication code (either generated in a separate challenge center 30 or in the service node 26) to the user's personal unit 20, as shown at step S18. Alternatively, one or more challenge codes can be sent to the personal unit 20 in advance. The personal unit 20 may display a prompt to prompt the user to input, for example, a security code, such as a PIN, or the terminal 22 may provide the prompt as shown in step S20. Upon entry of the user input, the algorithm unit 21b of the personal unit 20 calculates and sends a response code either to the display or to a dual tone multi-frequency generator, or both as shown in step S22. Other output devices can be used, such as radio wave (e.g., radio transmitter or transceiver), infrared, visible or ultra-violet generators (e.g., LED's or semiconductor lasers), electrically inductive couplers (e.g., induction coils), or forms of acoustic devices other than a DTMF generator.

The user then either manually inputs the displayed response code to the terminal 22, or the personal unit 20 directly inputs the response code in the case of a different type of output device. For example, when a dual tone multi-frequency (DTMF) generator is used with a communication system, the user presents generated tones to a microphone of such a system.

The service access network 24 transparently transmits the response code to the service node S25, which determines whether it is acceptable as shown in step S24. If the authentication center 30 performs the comparison of the received response code to the expected response code, the service node 26 will transmit the response code to the authentication center 30. Alternatively, the personal unit 20 can send via radio transmission the response directly to the authentication center 30 and the authentication center 30 can inform the service node 26 of the results. If the response code is not acceptable, the user's access to the service is denied and the process returns to either initiating the entire process or re-requesting the identification information as shown in step S26. Optionally, the system can disable the personal unit 20 if a predetermined number of denied access attempts occur or if the personal unit 20 has been reported as stolen.

If the response code is acceptable, the service is accessed and the user can perform the desired, available functions through the service node 26.

With reference to FIG. 1A, the basic procedure is examined with reference to specific, numbered communications of an exemplary embodiment.

(1) ENTER USERID: PTOEXAN.
(2) Service node 26 receives request for a service from PTOEXAN. This USERID is connected to Patent and Trademark Office Examiner Andersson. Service node 26 sends a request for authentication: "Please authenticate this user: Examiner Andersson."

(3) Challenge code is sent to Examiner Andersson's authentication pager.

(4) ENTER PASSWORD, which is sent to the data terminal 22 from the service node 26.

(5) Examiner Andersson enters PIN number to activate calculation of response code in personal unit 20. Response code is shown on the display of the personal unit 20, and then manually input to the data terminal 22. Alternatively, the response code can be sent via a radio link directly to the authentication center 30.

(6) The response code is sent from the service node 26 to the authentication center 30.

(7) Authentication center 30 compares the received response to the expected response and sends a message to the service node 26 informing node the authenticated/not authenticated.

(8) Authentication approved/not approved to the user.

As a concrete example of the present invention, a home banking application will be described. In this application, the intention is to transfer money from the owner's account to a different account, such as a creditor's account. The user can pay his bills at home using a telephone and a personal unit 20. In this example, all authentication steps performed by the user are manual. The resulting dialogue is as follows:

| User: | Initates a telephone call by calling a payment service telephone number of a bank. |
|---|---|
| Bank: | "Enter your account number." |
| User: | "4219231459#." |
| Bank: | "Please enter the following digits into your authentication unit - 1, 2, 3, 2, 8" (challenge code). Alternatively, if the challenge code is broadcast or previously stored in the personal unit, then this step is skipped "Please enter your challenge response code. |
| User: | Enters his PIN into the personal unit 20. The personal unit 20 presents a challenge response, e.g., "19283746", on the personal unit's display. The user enters "19283746" on the telephone keypad. |
| Bank: | "Enter account number of account to receive payment." |
| User: | "4313950678#." |
| Bank: | "Account of Ms. Jane Doe, Anytown, USA. Enter amount." |
| User: | "$500.00." |
| Bank: | "$500.00 is credited to the account of Ms. Jane Doe. Transaction reference number 123456." |
| User: | Hangs up. |

This procedure may be complicated by routines from interrupting if an error has occurred, routines for handling more than one transaction during a single call, routines for using another home telephone, etc.

A second exemplary procedure involves charging for long distance calls using a special service node (SSND. In this example, the authentication is provided when charging a long distance call through a long distance telephone company.

| User: | The special service node telephone is, e.g., with the prefix 900, followed by the long distance telephone number to be called, e.g., 900 555-1212. |
|---|---|
| SSN: | "Give ID and challenge response." |
| User: | Enters PIN into a personal unit 20 (which has received a radio transmitted challenge code) and the personal unit presents a challenge response on its display, e.g., "19283746." A button is then pressed and the personal unit's speaker is held against a microphone of the |

| | -continued |
|---|---|
| | telephone giving an acoustical DTMF output to the SSN, e.g., "#0859032843#19283746#" which includes a personal identity number and followed by a response to the challenge code. |
| SSN: | Authenticity of the response code is checked and, if acceptable, the connection is provided. |

The same personal unit 20 can be used for both the above transactions. A more automatic transaction can be implemented. For instance, the personal unit 20 may include a receiver and a DTMF transmitter, in which case, the user merely initiates access to a service and at a prompt inputs a user input, such as a PIN.

To avoid waiting for the paging system to transmit challenges over a wide area paging network, for example, it is possible to transmit several (e.g., three) challenge codes which are stored in the personal unit 20 until used when a PIN is entered to generate a response code. The response code subsequently generated is not to be used more than once if repeating an entry due to error.

The authentication center 30 can determine when to provide additional challenge codes to a personal unit 20 via a radio signal, because it receives the responses in order to perform the authentication. Alternatively, if the service node 26 receives the responses, the service node 26 requests the authentication center 30 to send the next expected response to the service node 26, so that the authentication center 30 can count the number of generated/used response codes. As stated previously, an authentication center 30 may be combined with a service node 26 or may be independently located and used by several service nodes.

The present invention can be implemented for any suitable service node 26 using existing networks without significant costs by setting up appropriate data exchanges between existing networks and service nodes. The response code may be used for authentication using any terminal in any networks, provided the terminal is capable of transmitting data. The response code may be sent via the authentication network 28 (e.g., via a radio signal).

According to one embodiment of the present invention, a method for authentication is provided which can be used for all electronic services subscribed by a user without requiring numerous passwords to be remembered. To achieve this, the authentication network 30 is connectable to all electronic networks or service nodes 26. When a user addresses a particular service node 26, requesting a service, the service node 26 sends a request for authentication to the authentication center 30. At reception of the request for authentication of a user, the authentication center 30 generates a challenge code which is sent to the user via the service node 26. The user may then manually input the challenge code and a user input, such as a PIN, into his personal unit 20, to receive a response code, shown on the display of the personal unit 20. The response may then be manually input to the terminal 22 used for accessing the service. An authenticity check may then be performed either by the authentication center 30 or by the service node 26.

The challenge code may also be sent to the personal unit 20 via radio from the authentication center 30, or sent as DTMF tones, for example via a PSTN telephone. The response code may also be sent to the authentication center 30 via radio or sent as DTMF tones, for example via a PSTN telephone.

This authentication method does not require any changes to existing terminals. The method allows the response code to be sent to the node 26 performing the authenticity check in a way suitable to the service application. The PIN code used to activate the calculation of a response in the personal unit 20 is the only "password" or PIN that must be memorized by the user.

The present invention may, of course, be carried out in other specific ways than those set forth herein without departing from the spirit and the central characteristics of the invention. The present embodiments are, therefore, to be considered in all respects as illustrative and not restrictive, and all changes coming within the meaning and the equivalency range of the appended claims are intended to be embraced herein.

What is claimed is:

1. A method for authenticating a prospective user of an electronic service associated with a service node, the user having a personal unit, said method comprising the steps of:

transmitting a challenge code generated from an authentication center, which is either separate from or integral in the service node, over a network that is independent of the type of electronic service being selected;

receiving said challenge code in said personal unit;

generating, in said personal unit, a response code based on an algorithm having at least said challenge code and a user input as variables;

generating, in said personal unit, an output code comprising said response code for either transmission from the personal unit to the authentication center or input to a terminal, said terminal being linked to said electronic service;

comparing by the authentication center or the service node said response code with an expected response code; and permitting access to said electronic service only when a result of said comparison step is accepted.

2. A method according to claim 1, further comprising the step of:

requesting access to said electronic service before said challenge code is received, wherein said challenge code is transmitted and received in response to said access request.

3. A method according to claim 1, further comprising the steps of:

storing one or more received challenge codes in said personal unit; and requesting access to said electronic service after said challenge code is received and stored, wherein said algorithm uses at least one of said stored challenge codes and a user input as variables in generating a response code.

4. A method according to claim 1, further comprising the steps of:

receiving said user input through a keypad.

5. A method according to claim 1, further comprising the steps of:

receiving said user input through a character recognition device.

6. A personal unit comprising:

a receiver for receiving a challenge code;

an input means for inputting a user input;

a response code generating means, linked to said receiver and said input means, for generating a response code in accordance with a received challenge code and a user input;

an output means for generating an output code comprising said response code for input to a terminal connected to an external electronic service, said personal unit being physically separate from said terminal and said terminal being at the location of the user.

7. A personal unit according to claim 6, wherein said receiver includes a radio wave receiver.

8. A personal unit according to claim 7, wherein said receiver includes conventional pager circuitry.

9. A personal unit according to claim 6, wherein said user input is a personal identification number.

10. A personal unit according to claim 6, wherein said input means includes a keypad.

11. A persona/unit according to claim 6, wherein said input means includes a character recognition device.

12. A personal unit according to claim 6, wherein said output means includes a display.

13. A personal unit according to claim 6, wherein said output means includes an acoustic generator.

14. A personal unit according to claim 13, wherein said acoustic generator includes a dual tone multi-frequency generator.

15. A personal unit according to claim 6, wherein said output means includes an optical generator.

16. A personal unit according to claim 15, wherein said optical generator includes at least one of a infrared generator, a visible light generator, and a ultraviolet light generator.

17. A personal unit according to claim 6, wherein said output means includes at least one electrically inductive coupler.

18. A personal unit according to claim 17, wherein said at least one electrically inductive coupler includes at least one induction coils.

19. A personal unit according to claim 6, wherein said output means includes a radio transmitter.

20. A personal unit according to claim 6, wherein said response code generator means calculates a response code in accordance with an algorithm wherein said received challenge code, said user input and a secret key stored in said personal unit are variables in the algorithm.

21. A personal unit according to claim 6, further comprising:

means for storing one or more received challenge codes in said personal unit, wherein said response code generating means generates a response code after said challenge code is received and stored, and wherein an algorithm uses at least one of said stored challenge codes and a user input as variables in generating a response code.

22. A system for granting access to an electronic service, comprising:

a personal unit for receiving a challenge code, for receiving a user input, and generating a response code according to a received challenge code and said user input;

a terminal linked to an authentication center, said terminal receiving said response code; and a network independent of said electronic service for sending said challenge code when access to a service is attempted; said network interconnecting comparing means for comparing said response code generated by said personal unit to an expected response code and permitting means for permitting access to said service only when a result of said comparison of said response code generated by said personal unit to said expected response code is accepted.

23. A system according to claim 22, wherein said network comprises:

a service access network for transmitting a request to access a service;

an authentication challenge network, linked to said authentication center, for transmitting said challenge code to said personal unit, said system further comprising:

at least one service node for providing a service including exchanging service data with a user through said service access network and for receiving said request to access a service causing the authentication center to generate a challenge code in response to said request to access a service.

24. A system according to claim 23, wherein said service access network further comprises means for transmitting said response code to said comparing means.

25. A system according to claim 24, wherein said comparing means is located in said authentication center.

26. A system according to claim 24, wherein said comparing means is located in said at least one service node.

27. A system according to claim 23, wherein said authentication challenge network further comprises means for transmitting said response code to said comparing means.

28. A system according to claim 27, wherein said comparing means is located in said authentication center.

29. A system according to claim 27, wherein said comparing means is located in said at least one service node.

30. A system according to claim 23, wherein said service access network includes a land-line telephone system.

31. A system according to claim 23, wherein said service node offers one or more services selected from the following group of services: banking services, credit card services, automatic teller machine services, account information services, general information services, security services, and long distance telephone services.

32. A system according to claim 23, wherein said authentication challenge network includes a radio transmitter.

33. A system according to claim 23, wherein said authentication challenge network includes a cellular telephone network.

34. A system according to claim 23, wherein said authentication challenge network includes a pager network.

35. A system according to claim 22, wherein said response code is generated according to an algorithm stored in said personal unit.

36. A system according to claim 22, wherein said personal unit generates said response code according to said received challenge code, said user input and a secret key stored in said personal unit.

37. A system according to claim 22, wherein said personal unit further comprises:

means for storing one or more received challenge codes in said personal unit, wherein said response code is generated after said challenge code is received and stored, and wherein an algorithm uses at least one of said stored challenge codes and a user input as variables in generating a response code.

* * * * *